Figure 3:
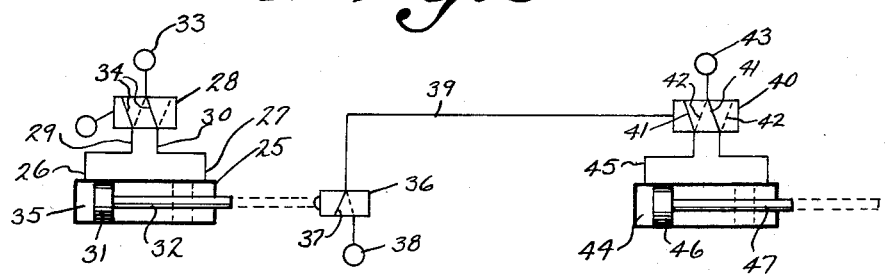

June 7, 1966 L. I. WALLE 3,254,672
AIR CIRCUIT CONTROL SYSTEM
Filed May 7, 1962 3 Sheets-Sheet 1
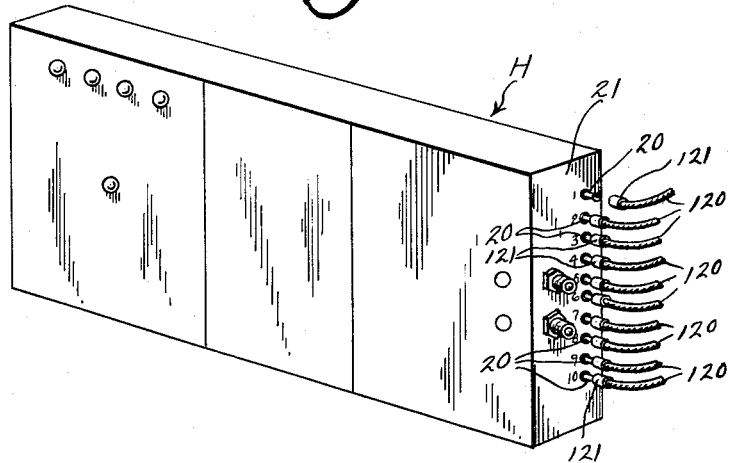
INVENTOR
L. IRWIN WALLE
BY *Wright Wright*
ATTORNEYS

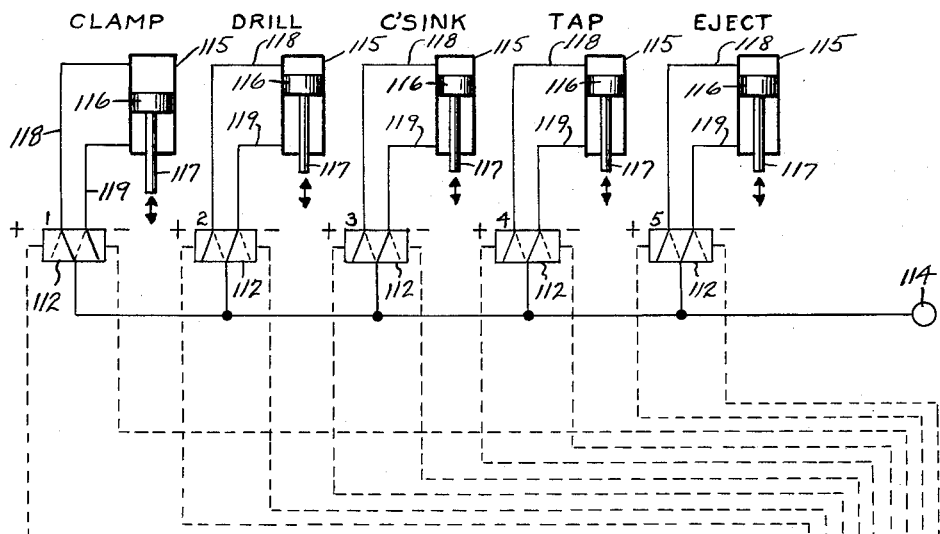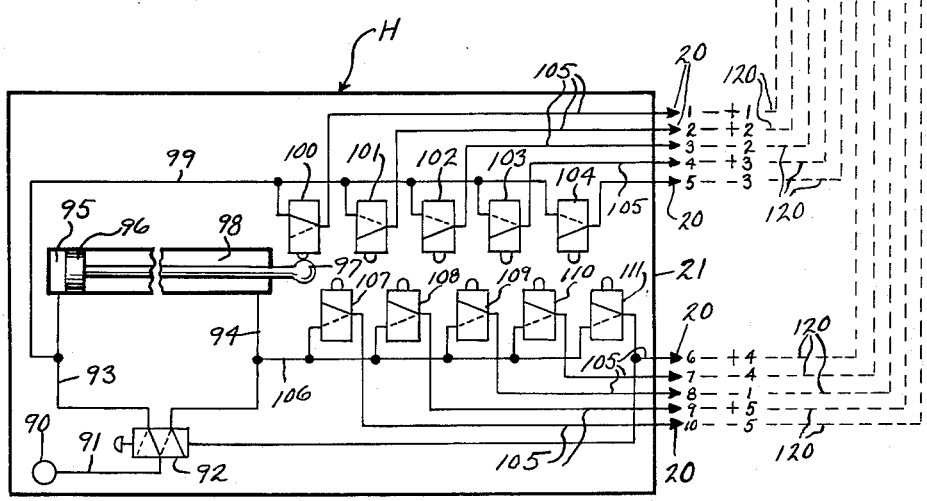

June 7, 1966   L. I. WALLE   3,254,672
AIR CIRCUIT CONTROL SYSTEM
Filed May 7, 1962   3 Sheets-Sheet 3

INVENTOR
L. IRWIN WALLE

BY *Wright & Wright*

ATTORNEYS

United States Patent Office 3,254,672
Patented June 7, 1966

3,254,672
AIR CIRCUIT CONTROL SYSTEM
Leonard Irwin Walle, Waterloo County, Ontario, Canada, assignor to Galland-Henning Manufacturing Company, Milwaukee, Wis., a corporation of Wisconsin
Filed May 7, 1962, Ser. No. 192,919
1 Claim. (Cl. 137—596.18)

This invention relates to control systems and more particularly to a new and novel air circuit control system for operating and regulating a desired sequence of manufacturing operations.

In the manufacturing of particular items, it is often necessary that a series of operations be performed on the product during its formation and manufacture, and various complicated controls have been heretofore used to regulate in proper sequence each step in the operation and formation of the product. It has been estimated that the valves and controlling mechanism usually run up to fifty percent of the cost of the machine per se, and this is true whether or not the controls are hydraulic or electronic. There has been a need, therefore, for some system to provide for a proper sequence of the manufacturing operations in such a manner that it can be adapted to any of a great variety of changing operations and one that can be primarily easily interchanged and rapidly set up by unskilled personnel. This is particularly true in a plant involved in what is termed "short run" production, and wherein a given machine is called upon to manufacture and develop an article for a short period, and then a different article for another period, involving a change in the sequence of operation from one article to another.

It is therefore a primary object of my present invention to provide a compact air control circuit that can readily adapt itself to any of a great variety of operations in any desired sequence, without the necessity of changing the basic control mechanism of the system, and without the necessity of changing the controls on the machine itself or to relocate the machine in its sequential operation.

Another object of the present invention is to provide a compact air control circuit that delivers an impulse to control points always, in the same and desired sequence.

Another important object of my invention is to provide an air control circuit that is particularly adapted to short run production problems, that will transmit power in controlled sequences and which sequences can be adapted to the desired operation of the machine or machines involved.

A further object is to provide a compact air control circuit that can be readily installed and used by untrained personnel without any experimentations or the like.

Still another object of my invention is to provide a novel air control circuit which has the advantage of utilizing very little equipment other than that which is normally used in the appropriate circuit itself and which can be transferred from one machine to another very rapidly without the necessity of each time having to change a complete circuit.

A salient object of my invention resides in providing a novel compact air control circuit contained within a relatively small housing that can, without changing the circuit within the housing, accomplish a infinite number of sequences in machine operations by providing a selection at the control points.

A further object of my invention is to provide a simple, practical and reliable construction that is economical to manufacture, easy to assemble and positive in its operation.

With the above and other objects in view, which will more readily appear as the nature of the invention is better understood, the same consists in the novel system, combination and arrangement of parts hereinafter more fully described, illustrated and claimed.

Figure 4:
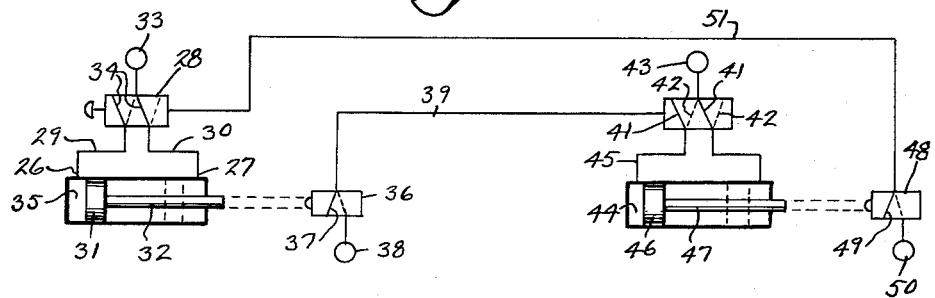
Figure 5:
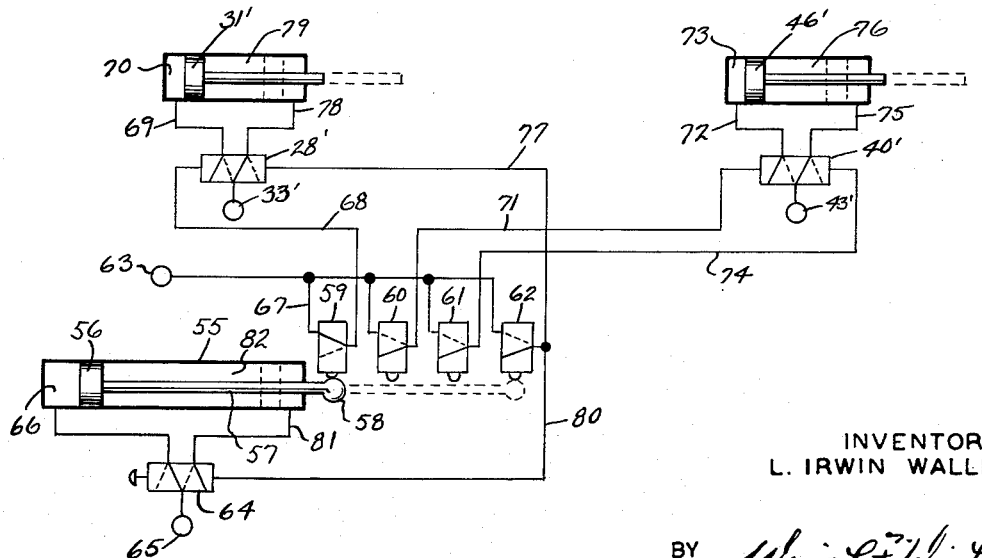

One preferred and practical embodiment of my invention is shown in the accompanying drawings in which FIGURE 1 is a front elevational view in perspective of my novel housing within which is contained the compact air circuit illustrated schematically in FIGURE 2 of the drawings;

FIGURE 2 is a schematic view not only showing the air circuit within the housing, but showing one of a number of different manufacturing operations that can be accomplished;

FIGURES 3 to 5, inclusive, illustrate the step by step development leading to the novel air circuitry contained within the housing and illustrated in FIGURE 2 of the drawings, and FIGURE 6 is a fragmentary view of an operating chart that can be made for each desired operation during the manufacture of a given article and pertaining in particular to the sequence operation shown and illustrated in FIGURE 2 of the drawings.

Referring now to the drawings in detail, wherein similar reference characters designate corresponding parts throughout the several views, the letter H generally indicates the substantially rectangular shaped housing which contains the necessary control valves and air circuits to provide a power impulse to the control points 20 protruding from the panel 21 of the housing H.

It is only necessary for the proper understanding of the present invention, that the control points 20 be designated by a given number, and in this instance each control point has been consecutively numbered 1 to 10 inclusive.

The novel air circuit illustrated in FIGURE 2 of the drawings was evolved as a result of considerable experimentation and inventive ingenuity and took a considerable length of time to properly develop, but actually is based on the simplest form of an air circuit illustrated schematically primarily in FIGURE 3 of the drawings, wherein an air cylinder 25 is provided having air inlets 26 and 27 at either end thereof and a control valve 28, which is operated to alternately provide air to one line 29 or the alternate line 30, so that the piston 31 carrying the rod 32 can be moved in the cylinder 25 from its full line position to its dotted line position. Air pressure is supplied from a main source designated by the numeral 33. Actually, the valve 28 can be of any desired structure, i.e., such as the spool type, so long as air is alternately supplied to the lines 29 and 30.

In the schematic view, the full line representation 34 allows air or air pressure to enter from the source of supply 33 to the line 30, and in the dotted line position air pressure is supplied from the source 33 to the line 29. Thus, when the valve is actuated to its dotted line position, air under pressure enters the chamber 35 and forces the piston to its dotted line position. If this piston is then made to contact a pilot valve 36 which moves the valve 37 from its full line to dotted line position and connects a main air supply with the line 39 another control valve 40 will be actuated from its full line position 41 to its dotted line position 42 and air from the main air supply 43 will be fed into the chamber 44 through line 45 and move the piston 46 from its full line position to its dotted line position. Now, if rod 47 (note FIGURE 4 of the drawings), is made to contact another pilot valve 48 which moves the valve 49 from its full line position to its dotted line position allowing air from the main air supply 50 to move through the line 51 back to the control valve 28, this valve will be repositioned from its dotted line position to its full line position, and piston 31 will be retracted. It should be understood that the pilot valves 36 and 48 are returned from the dotted line position to the full line position under spring pressure upon the retraction of the respective rods 32 and 47. With the valve 28 being repositioned, pilot valve 36 will be automatically returned to its dotted line position and piston 46 and rod 47 will then be retracted and will follow the retraction of the piston 31 and rod 32. In other words in this operation, the return of the piston 46 and 47 must await the return of the piston 31 and rod 32. Therefore, this circuit might be termed "non-adjustable" and the pilot valves are therefore located on a given machine in permanent position and are actuated by mechanisms operated by the cylinders. If it should be required that piston 46 be retracted before piston 31, it is obvious the circuit would have to be completely reworked and would involve additional pilot and control valves to be added to the circuit, and if a number of pistons and rods are required to operate in a given sequence, the resulting piping and number of valves would be considerable. Therefore, instead of having each working piston activate the pilot valves, I utilize another cylinder 55 carrying a piston 56, the rod 57 and a cam actuated end member 58. This cam 58 is made to operate in sequence a number of pilot valves 59, 60, 61 and 62. Each pilot valve is then connected to a single main source of air pressure 63 and when actuated will give a single impulse on one side only of the control cylinders 28' and 40' and each piston 31' and 46' must again be supplied from its respective air main supply 33' and 43' to accomplish the movement from the full line position to the dotted line position. It is obvious that control valve 64 can be moved to supply air from the main air supply 65 to the chamber 66 to move the piston 56 from its full line position to its dotted line position and as the piston 56 moves cam 58 will actuate in sequence each of the respective pilot valves 59, 60, 61 and 62, and will cause the air from the main air supply 63 to be fed to the control valves 28' and 40' in a definite controlled sequence.

As shown in FIGURE 5, cam 58 has depressed and actuated pilot valve 59 and moved the valve from its dotted line position to its full line position, wherein air and/or air pressure moves through the line 67 and line 68 to valve 28' and actuates that valve from its full line position to its dotted line position to supply air from the main air supply 33' through line 69 to the chamber 70 and thereby move the piston 31' from its full line position to its dotted line position.

Tracing the circuit from pilot valve 60 when it is actuated, it can be seen that air moves through line 71 to move the control valve 40' from its full line to its dotted line position, so that air is supplied from the main supply 43' through line 72 to chamber 73 to move piston 46' from its full line position to its dotted line position. When pilot valve 61 is acuated, air is fed from the main supply 63 through line 74 to move the control valve 40' from its dotted line position to its full line position, so that air is supplied from main supply 43' through line 75 to chamber 76 to retract piston 46' and actuation of the pilot valve 62 operates through lines 77 and 78 to chamber 79 in a like manner to retract piston 31' from the full line position to the dotted line position. I also add a line 80 which supplies an impulse to move the main control valve 64 from its full line position to its dotted line position so that air from the main supply 65 is fed through the line 81 to the chamber 82 to retract the piston 56. Obviously, in this particular circuit, as the cam is reversed and moved from its dotted line position back to its full line position, a signal will be given in reverse order through the pilot valves 62, 61, 60 and 59 and they will each be operated in reverse sequence.

Therefore, the main circuit shown in FIGURE 2 to give a great variety of operations in proper sequence was developed. This circuit as previously stated is contained within the housing H and includes a single main air supply 90, which supplies air through line 91 to the main control valve 92. As with the other circuits illustrated, the pilot valves and control valves have two positions and can be readily moved from the full line positions to their dotted line positions. The control valve 92 can be controlled manually in one direction and by air impulse in the opposite direction. Air, therefore, can be supplied through the control valve 92 alternately to lines 93 and 94 depending on the particular position of the control valve. Line 93 feeds air or air pressure to the chamber 95 to move the piston 96 forwardly and obviously, thereby moving and actuating the cam member 97. Line 94 will feed air to the chamber 98 to retract the piston 96 and thereby move the cam 97 rearwardly. From line 93, I provide a feed line 99 which supplies air to the upper bank of pilot valves 100, 101, 102, 103 and 104, respectively, and each of these pilot valves in turn is provided with lead lines 105 which terminate in the control points 20 that are numbered in sequence as shown. Line 94 also is similiarly provided with a feed line 106 which is utilized to provide air to the lower bank of pilot valves 107, 108, 109, 110 and 111 and each of these valves also is provided with the line 105 leading to the respective control point 20.

This forms therefore the basic control mechanism required, and as shown, this circuit and its valves can easily be mounted in a housing or enclosed in a box. As shown also, the leads 105 can be taken to a common point, namely, the front panel 21 and consecutively numbered as shown in FIGURES 1 and 2 of the drawings. Now, if balanced spool type of control valves 112 are used to receive the signals from the pilots, these valves 112 can in turn be mounted on the machine or on a panel of the machine, and numbered to correspond to the pistons they operate. Therefore, to provide any particular sequence of operation merely involves the attaching of lines with matching numbers and to set up any sequence of operation merely involves the question of matching these numbers throughout, and does not require complicated engineering or circuit drawings. An important feature of this invention resides in the fact that once the proper sequence has been decided upon by the engineer, unskilled personnel can easily set up the machine or machines by utilizing an operating chart 113 shown in FIGURE 6 of the drawings. To illustrate one sequence of operation on the chart as well as on the drawings in the upper portion of FIGURE 2, the thrust of the piston and piston rod is designated by a plus sign (+) while the retraction of the piston rod is designated as minus (—). It should also be kept in mind that this system can be utilized to operate electric motors and the like and should this be the case, the rotation of the motor clockwise would be designated plus and counter-clockwise minus. However, for purposes of describing the above adaptation, hydraulic or air cylinders are utilized to accomplish the various operations on the work. Therefore, a typical example of a circuit requirement is illustrated in the upper part of FIGURE 2 of the drawings, and in this case, the work has to be clamped and while clamped three tools have to advance and retract in sequence. When this is accomplished the work is unclamped and ejected. For purposes of illustration, air is fed from the main source of supply 114 to each of the control valves 112, and the alternate positions of the valves are designated by full and dotted lines. In each individual case, an air cylinder is represented by the numeral 115 and this moves its corresponding piston 116 and rod 117 alternately in the direction of the arrows to perform the work or function indicated. Obviously, when air is fed to line 118 the cylinder is moved in its downward or thrust position (plus) and when air is supplied to the line 119 the piston is retracted as indicated (minus). Now to perform the various operations in the required order, the sequence need only be shown as a series of plus and minus signs in the order required to achieve the series of movements, and these movements are made by attaching a series of jumper lines 120 in proper order and corresponding to the numerals found on the panel 21, at each control point. If these jumper lines 120 are permanent and marked with the number of the valve (plus) the operating part is characteristically marked, that is, plus 1, minus 1; plus 2, minus 2. The setting up of a sequence and selection can be then achieved easily by the cam 97 passing over each respective pilot valve in order, and incidentally, the order is always the same. Thus the control points 20 will give air impulses in an exact order from 1 to 10 as illustrated in the lower part of FIGURE 2 and on the panel 21 of FIGURE 1. It should also be remembered that as the piston 96 and cam 97 move forwardly alternately contacting pilot valves 100, 101, 102, 103 and 104 the control valve will be in the full line position and air will be supplied only to the lines 93 and 99, and not to lines 94 and 106.

Thus when the came contacts pilot valve 107 after pilot valve 100, no air impulse or signal will be given to control point 6; however, as the cam actuates valve 111 the control valve will be moved from its full line position to dotted line position cutting off air from line 93 and supplying air to lines 94 and 106, actuating the lower bank of pilot valves, and air signals or impulses will then be given in order from the number 6 to 10. As the cam 97 is retracted no impulse will then be given or received from the upper pilot valves.

In actual practice, these jumper lines 120 are provided with fittings 121 and these fittings are easily plugged into any desired control point 20 according to the number indicated on the chart 113. In the operation described, the work is first to be clamped, and thus, that is operation No. 1, and inasmuch as to clamp the work the cylinder for the clamp must be moved, in its thrust position (plus) we designate the first operation as plus 1 and place the numeral 1 in the plus column on the operating chart. It is obvious when referring to the chart that the work must be clamped while being drilled, countersunk and tapped and then it is to be unclamped, which happens to be operation No. 8, and inasmuch as the piston must be retracted it is designated as minus 1 on the operating chart. This is due to the fact that the clamping operation and its operating valve are designated as valve No. 1 plus or minus. By referring to the chart and as the cam 97 progresses, the drill which is the second operation and its jumper line will be attached to contact point No. 2, and of course, this jumper line must be the plus line. Then the minus jumper line on the drill is attached to operation No. 3 and designated as 2 minus. As the work has been unclamped, it must be ejected and this is operation No. 9 and when it is ejected the cylinder must be retracted and this is the last operation No. 10.

Thus looking at the chart it can be seen that first we clamp, then drill, retract the drill, countersink, retract countersink, tap, retract tap, unclamp, eject part, and last retract the ejector. It should also be obvious from the above that now by simply moving the jumper lines 120 from one contact point 20 to another a different sequence of operations will be performed upon the work since the thrust and retraction of said particular piston will then be in a different operational order and number. It should also be obvious that by making the pilot valves adjustable in their relative positions one to the other and by controlling the operation and movement of the piston 96 and its cam 97 a time factor can easily be taken into consideration. A second complete circuit including additional pistons, cam and upper and lower banks of pilot valves can be arranged in the same housing or support H to give 20 operations if desired.

Therefore, while I have shown and described certain specific embodiments of my invention, it will be understood that these embodiments are merely for the purpose of illustration, and various other valves and circuits and manufacturing operations can be utilized and may be devised, and changes may be made in the proportions and minor details of construction and arrangement of circuits without departing from the spirit of the invention or scope of the appended claims.

I claim:

An air circuit control for a desired sequence of manufacturing operations including, a supporting structure, a main source of air pressure, a line connected to said source carried by said support, a control valve operatively connected to said main air line, having a number of outlet ports adapted to be alternately placed in communication with said main air line, an air cylinder, a piston slidably received in said air cylinder, a shaft carried by said piston, a cam on the outer termination of said shaft, said cylinder on one side of said piston being in communication with one outlet port of said control valve and the other outlet port of said control valve being in communication with said cylinder on the other side of said piston, a series of pilot valves being so constructed and arranged as to be operative by movement of said cam, said series of pilot valves each having a line in open communication with said main air line and each having an outlet port, a series of lines each connected to a respective outlet of a respective pilot valve, said air lines terminating in control points open to the atmosphere, and a series of jumper lines each carrying a fitting adapted to be operatively connected with a respective control point, said control points being consecutively designated and said cam opening communication between said main air line and said outlet port of a respective pilot valve in the same consecutive designated order, whereby positioning of said jumper lines in any desired order will cause the desired manufacturing operation to be accomplished.

References Cited by the Examiner
UNITED STATES PATENTS
1,652,845  12/1927  Vennum _____ 137—627 X M. CARY NELSON, *Primary Examiner.*

W. CLINE, *Assistant Examiner.*